(12) United States Patent
Yebka et al.

(10) Patent No.: US 11,394,227 B2
(45) Date of Patent: Jul. 19, 2022

(54) POWER MANAGEMENT DURING SYSTEM STARTUP AT LOW TEMPERATURES

(71) Applicant: LENOVO (Singapore) PTE. LTD., New Tech Park (SG)

(72) Inventors: Bouziane Yebka, Apex, NC (US); Jeremy R. Carlson, Cary, NC (US); Philip Jakes, Durham, NC (US); Tin-Lup Wong, Chapel Hill, NC (US)

(73) Assignee: LENOVO (Singapore) PTE. LTD., New Tech Park (SG)

( * ) Notice: Subject to any disclaimer, the term of this patent is extended or adjusted under 35 U.S.C. 154(b) by 88 days.

(21) Appl. No.: 16/864,433

(22) Filed: May 1, 2020

(65) Prior Publication Data

US 2021/0344213 A1 Nov. 4, 2021

(51) Int. Cl.
*H02J 7/00* (2006.01)
*H01M 10/615* (2014.01)
*H01M 10/6551* (2014.01)
*H01M 10/63* (2014.01)
*H01M 10/44* (2006.01)
*H01M 10/6563* (2014.01)
(Continued)

(52) U.S. Cl.
CPC .......... *H02J 7/007194* (2020.01); *G06F 1/28* (2013.01); *H01M 10/4257* (2013.01); *H01M 10/4264* (2013.01); *H01M 10/443* (2013.01); *H01M 10/615* (2015.04); *H01M 10/623* (2015.04); *H01M 10/63* (2015.04); *H01M 10/658* (2015.04); *H01M 10/6551* (2015.04); *H01M 10/6563* (2015.04); *H01M 10/6571* (2015.04); *H02J 7/345* (2013.01); *H01M 2010/4271* (2013.01); *H01M 2220/30* (2013.01)

(58) Field of Classification Search
CPC .. H02J 7/007194; H02J 7/345; H01M 10/658; H01M 10/6551; H01M 10/623; H01M 10/443; H01M 10/4264; H01M 10/6563; H01M 10/6571; H01M 10/4257; H01M 10/615; H01M 10/63; H01M 2220/30; H01M 2010/4271; G06F 1/28
USPC ........................................................ 320/134
See application file for complete search history.

(56) References Cited

U.S. PATENT DOCUMENTS 4,314,008 A * 2/1982 Blake .................. H01M 10/613
429/8
4,546,408 A * 10/1985 Rodseth ................ H05K 3/325
361/720

(Continued)

FOREIGN PATENT DOCUMENTS

AU 2011206309 B2 * 5/2016 ............. F24S 10/90
BR 112019019195 A2 * 4/2020 ............. B23K 9/207
(Continued)

*Primary Examiner* — M Baye Diao
(74) *Attorney, Agent, or Firm* — Kunzler Bean & Adamson; Bruce R. Needham (57) ABSTRACT

Apparatuses, systems, devices, and methods for power management during system startup at low temperatures are disclosed. An apparatus includes a battery for an electronic device. The battery includes one or more cells. The apparatus includes a thermal insulation element configured to insulate heat that the battery. The thermal insulation element is coupled to the battery to prevent at least a portion of the heat that the battery generates from being dissipated from the battery during startup of the electronic device.

20 Claims, 5 Drawing Sheets

(51) Int. Cl.
   *H01M 10/42*   (2006.01)
   *H01M 10/623*  (2014.01)
   *G06F 1/28*    (2006.01)
   *H02J 7/34*    (2006.01)
   *H01M 10/658*  (2014.01)
   *H01M 10/6571* (2014.01)

(56) References Cited

U.S. PATENT DOCUMENTS

| | | | | |
|---|---|---|---|---|
| 4,689,659 A * | 8/1987 | Watanabe | H01L 27/0211 | |
| | | | 257/469 | |
| 5,544,696 A * | 8/1996 | Leland | F28F 13/02 | |
| | | | 165/80.4 | |
| 6,136,466 A * | 10/2000 | Takeuchi | H01M 6/10 | |
| | | | 429/94 | |
| 6,146,783 A * | 11/2000 | Brohm | H01M 50/24 | |
| | | | 429/231.95 | |
| 6,917,634 B2 * | 7/2005 | Ishizu | H01S 3/0941 | |
| | | | 372/75 | |
| 7,351,377 B2 * | 4/2008 | Chazan | B81C 3/001 | |
| | | | 422/502 | |
| 8,118,733 B2 * | 2/2012 | Scott | G02B 23/2476 | |
| | | | 348/182 | |
| 8,183,574 B2 * | 5/2012 | Ferru | H01L 25/167 | |
| | | | 257/725 | |
| 8,611,091 B2 * | 12/2013 | Guo | H05K 7/209 | |
| | | | 361/708 | |
| 8,685,553 B2 * | 4/2014 | Rich | H01M 10/613 | |
| | | | 429/9 | |
| 8,857,426 B2 * | 10/2014 | Klier | F24S 40/55 | |
| | | | 126/643 | |
| 8,993,145 B2 * | 3/2015 | Muniz | H01M 10/6551 | |
| | | | 429/62 | |
| 9,148,979 B2 * | 9/2015 | Chiriac | H05K 7/20436 | |
| 9,683,792 B2 * | 6/2017 | Possinger | F28F 13/14 | |
| 9,900,951 B1 * | 2/2018 | Lee | F21V 29/773 | |
| 10,505,204 B2 * | 12/2019 | Deska | H01M 10/625 | |
| 10,700,399 B2 * | 6/2020 | Doege | H01M 10/39 | |
| 2003/0221717 A1 * | 12/2003 | Dessel | F24F 5/0046 | |
| | | | 136/201 | |
| 2007/0212597 A1 * | 9/2007 | Herlinger | H01M 10/052 | |
| | | | 219/494 | |
| 2012/0141841 A1 * | 6/2012 | Rich | H01M 10/613 | |
| | | | 429/9 | |
| 2012/0141842 A1 * | 6/2012 | Rich | H01M 16/006 | |
| | | | 429/9 | |
| 2013/0071717 A1 * | 3/2013 | Muniz | H01M 10/6551 | |
| | | | 429/120 | |
| 2017/0358831 A1 * | 12/2017 | Milroy | H01M 10/441 | |
| 2018/0358668 A1 * | 12/2018 | Doege | H01M 10/6571 | |
| 2019/0162460 A1 * | 5/2019 | Oh | H01L 35/28 | |
| 2019/0237974 A1 * | 8/2019 | Dang | H02J 7/007 | |
| 2020/0243930 A1 * | 7/2020 | Raedler | H01M 10/63 | |
| 2021/0135317 A1 * | 5/2021 | Oka | H01M 50/289 | |
| 2021/0254877 A1 * | 8/2021 | Massenzo | F25D 3/08 | |

FOREIGN PATENT DOCUMENTS

| | | | | |
|---|---|---|---|---|
| CA | 2804221 C | * | 1/2018 | ............ A47J 36/28 |
| JP | 5041182 B2 | * | 10/2012 | ............ Y02E 60/10 |
| KR | 20080036737 A | * | 4/2008 | ........ H01M 10/0587 |
| RU | 2765362 C2 | * | 1/2022 | ............... A24D 3/17 |
| WO | WO-2014131723 A1 | * | 9/2014 | ................... E04B 1/74 |
| WO | WO-2017124441 A1 | * | 7/2017 | ........ H01M 10/625 |

* cited by examiner

POWER MANAGEMENT DURING SYSTEM STARTUP AT LOW TEMPERATURES

FIELD

The subject matter disclosed herein relates to electronic devices and more particularly relates to power management during system startup at low temperatures.

BACKGROUND

Electronic devices can include batteries that are used to power the devices when they are not connected to a continuous power source. Battery performance may be impacted by temperatures within the battery's environment and on the battery's operation rate. Charge transfer kinetics may be the limiting factor in low temperature operation of the battery. At high discharge rate and user isothermal conditions, the anode electrolyte resistance may become dominant, due to highly reduced ionic conductivity from large electrolyte concentration polarizations. Therefore, at low temperatures, the power cut-off setting may be easily triggered during a heavy power load due to the high battery impedance.

BRIEF SUMMARY

An apparatus for power management during system startup at low temperatures is disclosed. In one embodiment, an apparatus includes a battery for an electronic device. The battery may include one or more cells. In certain embodiments, the apparatus includes a thermal insulation element that is configured to insulate heat that the battery generates. In certain embodiments, the thermal insulation element is coupled to the battery to prevent at least a portion of the heat that the battery generates from being dissipated from the battery during startup of the electronic device.

A system for power management during system startup at low temperatures is disclosed. A system, in one embodiment, includes a battery for an electronic device. The battery may include one or more cells. In certain embodiments, the system includes a thermal insulation element that is configured to insulate heat that the battery generates. In one embodiment, the system includes a temperature module that monitors a temperature associated with the electronic device during startup of the electronic device. In various embodiments, the system includes a power module that, in response to the temperature being less than a threshold temperature, makes one or more adjustments that are related to the battery based on the temperature associated with the electronic device during startup of the electronic device.

A method for power management during system startup at low temperatures is disclosed. A method, in one embodiment, includes determining a temperature associated with an electronic device during startup of the electronic device. The electronic device includes a battery and a thermal insulation element configured to insulate heat that the battery generates. In further embodiments, in response to the temperature being below a threshold temperature, the method includes making one or more adjustments that are related to the battery based on the temperature associated with the electronic device during startup of the electronic device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

The description of elements in each figure may refer to elements of proceeding figures. Like numbers refer to like elements in all figures, including alternate embodiments of like elements.

An apparatus for power management during system startup at low temperatures is disclosed. In one embodiment, an apparatus includes a battery for an electronic device. The battery may include one or more cells. In certain embodiments, the apparatus includes a thermal insulation element that is configured to insulate heat that the battery generates. In certain embodiments, the thermal insulation element is coupled to the battery to prevent at least a portion of the heat that the battery generates from being dissipated from the battery during startup of the electronic device.

In one embodiment, the thermal insulation element is configured to insulate heat that the battery generates up to a predefined temperature and the thermal insulation element is configured to conduct heat away from the battery in response to the heat that the battery generates exceeding the predefined temperature. In one embodiment, the thermal insulation element is coupled to at least one cell of the one or more cells of the battery.

In various embodiments, the thermal insulation element is coupled to the battery and covers at least one surface of the battery. In one embodiment, wherein at least one cell of the one or more cells of the battery comprises a jelly roll, the insulation element wrapped around the jelly roll. In various embodiments, the insulation element comprises an insulating sheet that includes a nano silica balloon insulator ("NASBIS") sheet.

In one embodiment, the apparatus includes an electrical heating element coupled to the battery. The electrical heating element may be activated during startup of the electronic device and configured to operate until a threshold temperature is satisfied. In certain embodiments, the electrical heating element is embedded within the battery. In various embodiments, the electrical heating element is embedded within a label adhered to the battery.

A system for power management during system startup at low temperatures is disclosed. A system, in one embodiment, includes a battery for an electronic device. The battery may include one or more cells. In certain embodiments, the system includes a thermal insulation element that is configured to insulate heat that the battery generates. In one embodiment, the system includes a temperature module that monitors a temperature associated with the electronic device during startup of the electronic device. In various embodiments, the system includes a power module that, in response to the temperature being less than a threshold temperature, makes one or more adjustments that are related to the battery based on the temperature associated with the electronic device during startup of the electronic device.

In one embodiment, the power module is configured to adjust a discharge current of the battery to be less than a predefined threshold. In certain embodiments, the predefined threshold is 0.5 C, where C is a rate at which the battery is discharged relative to its maximum capacity. In one embodiment, the power module disables a fan within the electronic device during startup of the electronic device. The fan may be operable to dissipate heat from the electronic device.

In one embodiment, the system includes a supercapacitor. The power module may be configured to trigger discharge of the supercapacitor during startup of the electronic device. In various embodiments, the system includes a heater embedded in the battery. The power module may be configured to activate the heater during startup of the electronic device.

In one embodiment, the power module is configured to dynamically adjust a cut-off voltage threshold for the electronic device during startup of the electronic device. The cut-off voltage threshold may be set in firmware for the electronic device.

A method for power management during system startup at low temperatures is disclosed. A method, in one embodiment, includes determining a temperature associated with an electronic device during startup of the electronic device. The electronic device includes a battery and a thermal insulation element configured to insulate heat that the battery generates. In further embodiments, in response to the temperature being below a threshold temperature, the method includes making one or more adjustments that are related to the battery based on the temperature associated with the electronic device during startup of the electronic device.

In one embodiment, the method includes adjusting a discharge current of the battery to be less than a predefined threshold. The predefined threshold may be 0.5C, where C is a rate at which the battery is discharged relative to its maximum capacity. In certain embodiments, the method includes triggering discharge of a supercapacitor during startup of the electronic device. In some embodiments, the method includes activating a heater embedded in the battery during startup of the electronic device.

Figure 1:
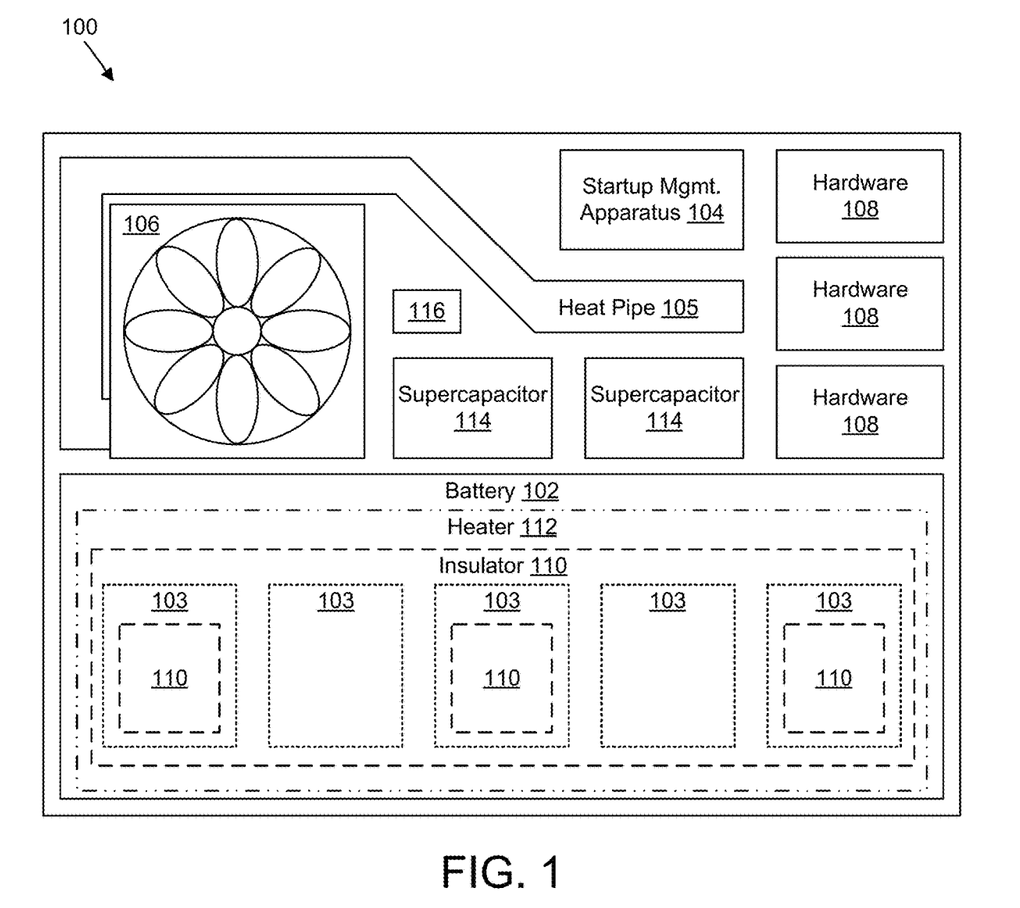
FIG. 1 is a schematic block diagram illustrating one embodiment of an interior of a computing device in accordance with the subject matter disclosed herein.

FIG. 1 is a schematic block diagram illustrating one embodiment of an interior of an electronic device, which may include a computing device 100 in accordance with the subject matter disclosed herein. In one embodiment, the computing device 100 includes various components such as a battery 102, a heat pipe 105, a startup management apparatus 104, a fan 106, hardware components 108 (e.g., processors, memories, storage devices, peripheral devices, and/or the like), insulator elements 110, a heater 112, supercapacitors (ultracapacitors) 114, and a thermometer 116, which are described in more detail below.

In one embodiment, the computing device 100 may be a consumer electronic device such as a laptop computer, a desktop computer, a set-top box, a gaming console, a security system, a smart phone, a tablet computer, a smart watch, a smart speaker, a television, a security system, a kitchen appliance, a garage door opener, a component in a vehicle, and/or the like. The computing device 100 may be a portable or mobile device that includes a battery 102, or multiple batteries 102, for powering the computing device 100.

The battery 102, in certain embodiments, is a rechargeable battery, e.g., a lithium-ion battery, and includes multiple cells 103 that each generate a certain amount of heat while the computing device 100 is powered on and/or actively used and drawing power from the battery 102. The battery 102 may have a conventional or consistent configuration or may have an irregular or inconsistent configuration, e.g., the cells 103 of the battery 102 may have different characteristics, e.g., different dimensions or the like, that may impact how heat is generated in the battery 102, the locations of the heat regions in the battery 102 (e.g., the head gradient), and/or the like.

In certain embodiments, at least one cell 103 of the one or more cells_103 of the battery 102 comprises a jelly roll. As used herein, a jelly roll or Swiss roll design includes a layer of an anode material, a separator layer, and a cathode material that is layered on top. This sandwich is then rolled up and inserted into a hollow cylinder casing. The battery 102 is sealed, metal contacts are attached, and an optional button top is applied if the battery 102 is intended to replace an AAA/AA/C/D alkaline battery. A label with the brand name is then applied, or a blank protective label for a generic or OEM battery.

In certain embodiments, to account for battery performance in low temperatures, various characteristics of the battery 102 and/or battery cell 103 may be determined during manufacturing. For instance, at the cell level, the cell DCIR may be improved to enhance low temperature capability. Capacity planning may be implemented for the battery 102 based on the system power request during startup. An amount of conductive carbon in the anode and the cathode of the battery 102 may be increased. The graphite particle radius within the cell 103 may be decreased. The electrolyte concentration within the cell 103 may be increased. The salt diffusivity in electrolyte and solid-state lithium diffusivity in graphite particles may be increased to improve cell discharge capacity.

In further embodiments, the computing device 100 includes a heat pipe 105 that is coupled to a fan 106 for dissipating heat from various components 108 of the computing device 100 and out of or away from the computing device 100. A heat pipe 105, as used herein, is a heat-transfer device that combines the principles of both thermal conductivity and phase transition to effectively transfer heat between two solid interfaces.

In certain embodiments, at the hot interface of a heat pipe 105 a liquid in contact with a thermally conductive solid surface turns into a vapor by absorbing heat from that surface. The vapor then travels along the heat pipe 105 to the cold interface, e.g., the fan 106, and condenses back into a liquid—releasing the latent heat. The liquid then returns to the hot interface through either capillary action, centrifugal force, or gravity, and the cycle repeats.

In one embodiment, as described in more detail below, the startup management apparatus 104 is configured to monitor a temperature associated with the computing device 100 during startup of the electronic device, and, in response to the temperature being less than a threshold temperature, makes one or more adjustments that are related to the battery 102 based on the temperature associated with the computing device 100 during startup of the computer device 100. The startup management apparatus 104 will be described below in more detail with reference to FIG. 5.

In one embodiment, the fan 106 comprises a fan that is configured to dissipate heat away from the interior of the computing device 100, e.g., away from the hardware components 108, and out of the interior of the computing device 100 using air flow that the fan 106 generates. In certain embodiments, even though a fan 106 is depicted in the computing device 100 of FIG. 1, one of skill in the art will recognize, in light of this disclosure, that some computing devices 100 may not have a fan 106, such as compact devices like smart phones, tablet computers, smart watches, and/or the like. In such embodiments, heat pipes 105 may still be used as a way to dissipate heat from various hardware components 108 of the computing device 100.

The hardware components 108 may include various hardware components of a computing device 100 such as processors, memories, storage devices, network cards, graphics cards, sounds cards, chips, field programmable gate arrays, application-specific integrated circuits, and/or the like.

The insulators 110, in one embodiment, comprise thermal insulation elements that are coupled to the battery 102 to prevent at least a portion of the heat that the battery 102 generates from being dissipated from the battery 102 during startup of the computing device 100. In certain embodiments, the insulators are configured to reduce thermal conduction from the battery 102 during startup of the electronic device 100. In further embodiments the insulators 110 comprise material that is configured to insulate heat that the battery 102 generates up to (and/or including) a threshold temperature and then conduct heat that the battery 102 generates away from the battery 102 and the electronic device 100 once the temperature exceeds the threshold temperature.

In one embodiment, the insulators 110 are coupled to at least one cell 103 of the battery 102 (e.g. dashed boxes in the cell 103). In further embodiments, the insulators 110 are coupled to the battery as a whole 102 (e.g. rectangle around the cells 103) and cover at least one surface of the battery 102. In some embodiments, the insulators 110 may comprise portions of labels that are affixed to the surface of the battery 102.

In one embodiment, the insulators 110 comprise insulation sheets. The insulations sheets, in various embodiments, may comprise a material that has properties that allow the material to insulate heat that the battery 102 generates up to a threshold temperature and then conduct heat away from the battery 102 after the temperature reaches the threshold temperature. In some embodiments, the insulating sheet 110 comprises a nano silica balloon insulator ("NASBIS") sheet material. In certain embodiments, where the battery cell 103 comprises a jelly roll, the insulation sheet may comprise a portion of the jelly roll such as a layer that is wrapped up as part of the jelly roll.

In one embodiment, the heater 112 comprises an electrical heating element that is coupled to the battery 102. The heater 112 may be activated during startup of the computing device 100 to provide heat to the battery 102 and/or the computing device 100 in general. In one embodiment, the heater 112 is activated during startup in response to the temperature of the battery 102 and/or the computing device 100 in general being below a threshold temperature. Once activated, when the temperature of the battery 102 and/or the computing device 100 reaches the threshold temperature, the heater 112 is turned off or otherwise deactivated.

In one embodiment, the heater 112 is coupled to a surface of the battery 102, encompasses the battery 102, and/or is embedded within the battery 102. In certain embodiments, each battery cell 103 has a corresponding heater 112 that is part of the cell or is located on the battery surface adjacent to a battery cell 103 (e.g., above or below the cell 103). In various embodiments, the heater 112 comprises at least a portion of a label or is embedded in a label that is affixed or adhered to the battery 102. The heater may be electrically coupled to a power supply or other power source within the computing device 100.

In one embodiment, the computing device 100 includes one or more supercapacitors 114 that are configured to provide additional heat to the battery 102 and/or the computing device 100 in general during startup of the computing device 100. As used herein, supercapacitors 114, also known as ultracapacitors, may be embodied as a high-capacity capacitor with a capacitance value much higher than other capacitors, but with lower voltage limits, that bridges the gap between electrolytic capacitors and rechargeable batteries. It typically stores 10 to 100 times more energy per unit volume or mass than electrolytic capacitors, can accept and deliver charge much faster than batteries 102, and tolerates many more charge and discharge cycles than rechargeable batteries 102.

During startup of the computing device 100, if the temperature is below a threshold temperature for the battery 102 and/or the computing device 100, the supercapacitors 114 may be triggered, fired, or the like to generate heat for the battery 102, a battery cell 103, and/or the computing device 100 during startup until the temperature reaches a threshold temperature. The supercapacitors 114 may fire once, may fire a number of times, may fire in sequence, may fire all at once, and/or the like depending on the temperature requirements of the computing device 100 during startup.

The computing device 100 may further comprise a thermometer 116 that is configured to sense, monitor, and/or report the temperature within the computing device 100, including the temperature of the battery 102 and/or battery cells 103.

Figure 2:
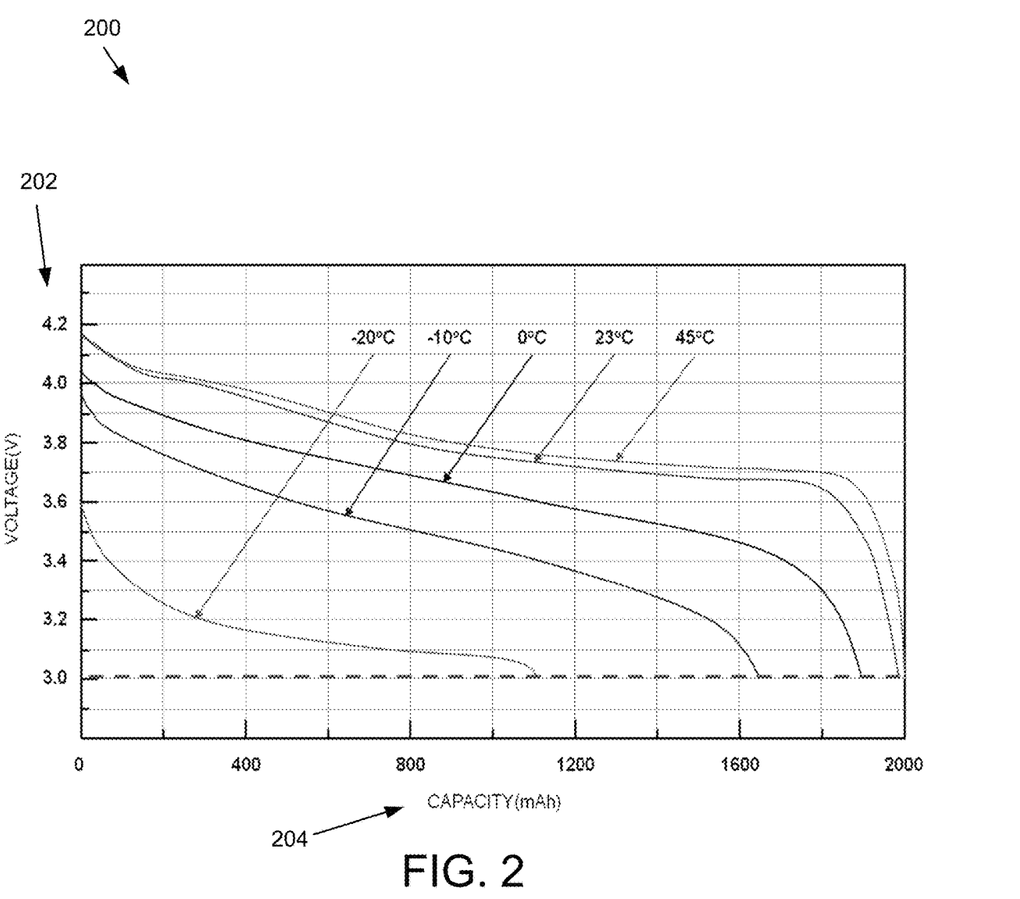
FIG. 2 is a graph of conventional battery discharge at various temperatures.

FIG. 2 depicts a graph 200 of conventional battery discharge at various temperatures. The graph 200 shows that as temperatures become colder, the performance of the battery 102 decreases. For instance, at −20° Celsius, the voltage dramatically drops from 3.6 V to 3.0 V at a much lower capacity than at higher temperatures, such as 45° Celsius. The decrease in battery performance 102 may be due to the lower temperatures, which may prevent a computing device 100 from successfully starting up because the battery 102 reaches a cut-off voltage, e.g., 3.0 V and triggers system shutdown because the battery 102 does not have capacity to handle the load on the computing device 100 at the low temperatures. As used herein, the cut-off voltage may be a voltage setting, that is set in firmware, that causes the system to automatically shut down when the battery voltage reaches the cut-off voltage during the startup period of the device (e.g., when the device is first turned on and is starting different systems, operating systems, applications, and/or the like at startup).

Figure 3A:
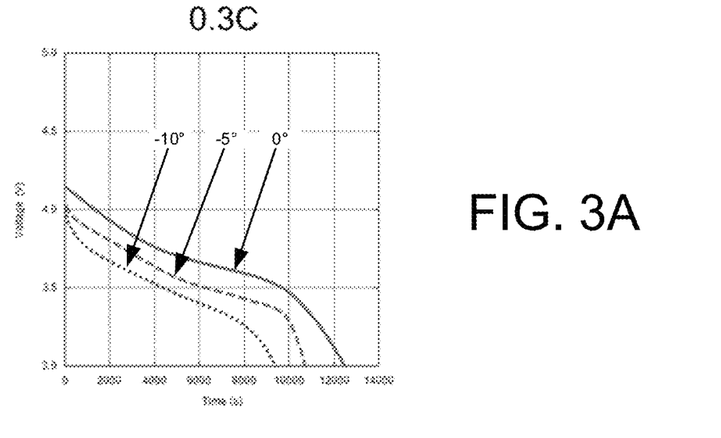
FIG. 3A is a graph of conventional battery discharge at various temperatures at a particular discharge rate.
Figure 3B:
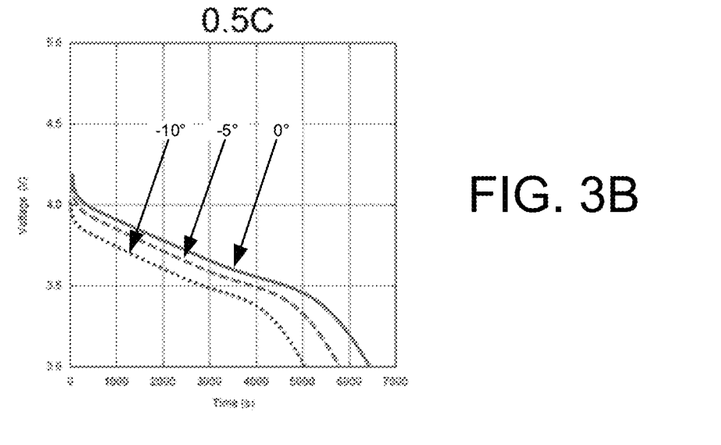
FIG. 3B is another graph of conventional battery discharge at various temperatures at a particular discharge rate.
Figure 3C:
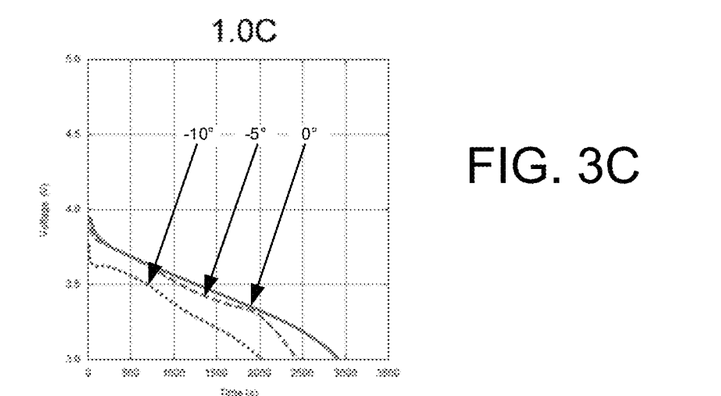
FIG. 3C is another graph of conventional battery discharge at various temperatures at a particular discharge rate.

FIGS. 3A-3C depict graphs of conventional battery discharge at various temperatures at particular discharge rates. For instance, FIG. 3A shows that at a discharge rate of 0.3 C (C being the battery discharge rate), a battery at −10° Celsius discharges to a cut-off voltage of 3 V in about 8500 seconds while a battery at 0° Celsius discharges to the cut-off voltage of 3 V at about 12500 seconds. Similarly, in FIG. 3B, at a discharge rate of 0.5 C, a battery at −10° Celsius discharges to a cut-off voltage of 3 V in about 5000 seconds while a battery at 0° Celsius discharges to the cut-off voltage of 3 V at about 6500 seconds. Further, FIG. 3C shows that at a discharge rate of 1.0 C, a battery at −10° Celsius discharges to a cut-off voltage of 3 Vat about 2000 seconds while a battery at 0° Celsius discharges to the cut-off voltage of 3 V at about 3000 seconds.

Thus, at lower temperatures, the battery 102 for a computing device 100 performs worse than at higher temperatures. Under different discharge rates and temperatures, the cut-off voltage threshold is reached at different times, which may trigger the voltage cut-off threshold under different workloads/discharge rates. Accordingly, the system may automatically shut down when the cut-off voltage is reached, which can be an annoyance to users who are trying to use computing devices in colder temperature environments.

The subject matter disclosed herein corrects for the inefficiencies and shortcomings of conventional battery discharge during startup at lower temperatures. By using insulation layers, electrical heaters, and/or other modifications as described below, a computer system 100 is able to startup successfully at lower temperatures, e.g., avoid the cut-off voltage threshold, which would not normally be possible using a conventional battery system.

Figure 4:
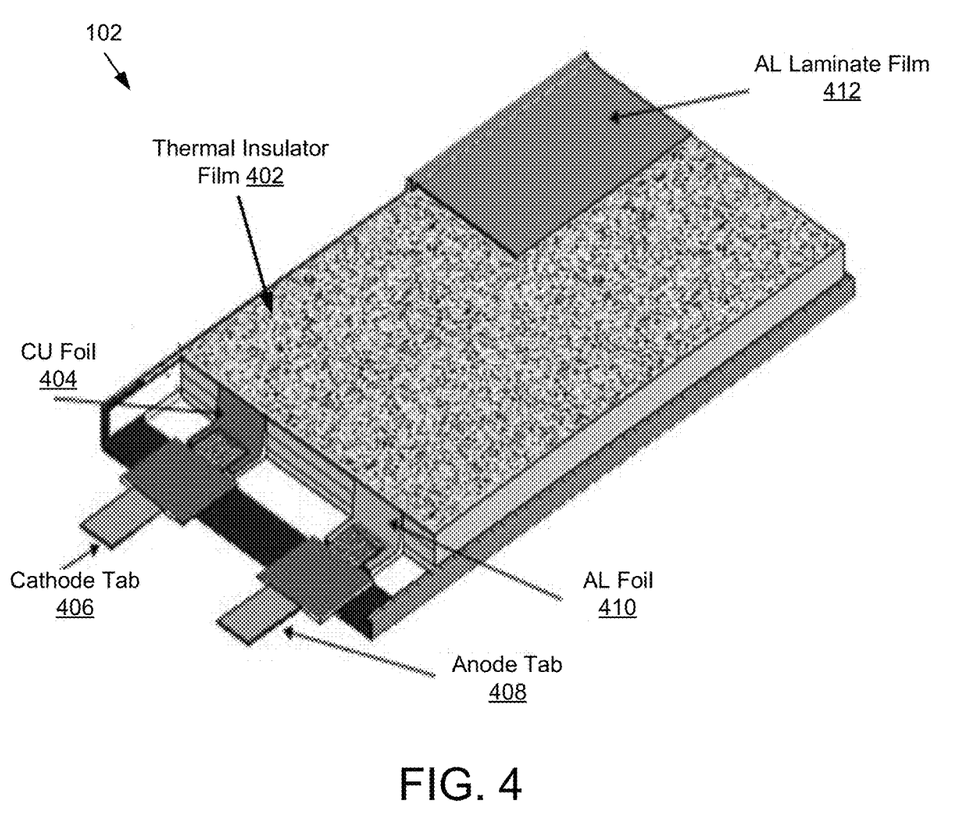
FIG. 4 is a diagram illustrating one embodiment of a battery in accordance with the subject matter disclosed herein.

FIG. 4 is a diagram illustrating one embodiment of a battery 102 in accordance with the subject matter disclosed herein. The battery 102 may be installed in a computing device such as a laptop computer, a tablet computer, and/or the like. The battery 102 may also be used for various electronic devices such as appliances, televisions, gaming consoles, and/or the like.

In certain embodiments, the battery 102 includes various components including a thermal insulator film layer 402, a copper foil layer 404, a cathode tab 406, an anode tab 408, an aluminum foil layer 410, and an aluminum laminate film layer 412. The thermal insulator film layer 402, in the depicted embodiment, comprises one interior layer of the battery 102. In other embodiments, the thermal insulator film layer 402 may be part of a battery cell 103, may be coupled on an exterior surface of the battery 102, and/or the like.

As described above, the thermal insulator film layer 402 may be embodied as a insulation sheet that can insulate heat generated by the battery 102 during startup of the battery 102 until the temperature of the battery 102/computing device 100 reaches a threshold temperature, e.g., 65° Celsius, in which case the insulation sheet begins to dissipate heat away from the battery 102. In such an embodiment, the insulation sheet may include a NASBIS insulation sheet, which, as used herein, is a high-performance insulation sheet that comes in thicknesses of 50 micrometers (μm), 100 μm, 500 μm, 1000 μm, or the like and has a low thermal conductivity of 0.018 to 0.024 W/mK due to a pore diameter which is smaller than a free path of air (68 nm).

In this manner, the battery 102 can be self-heated using the heat that it generates by preventing dissipation of the heat using the insulation layer until the temperature reaches a threshold temperature, e.g., 65° Celsius, at which case the insulation layer allows heat to dissipate from the battery 102. This assists in preventing the battery 102 from reaching the cut-off voltage during system startup at lower temperatures.

Figure 5:
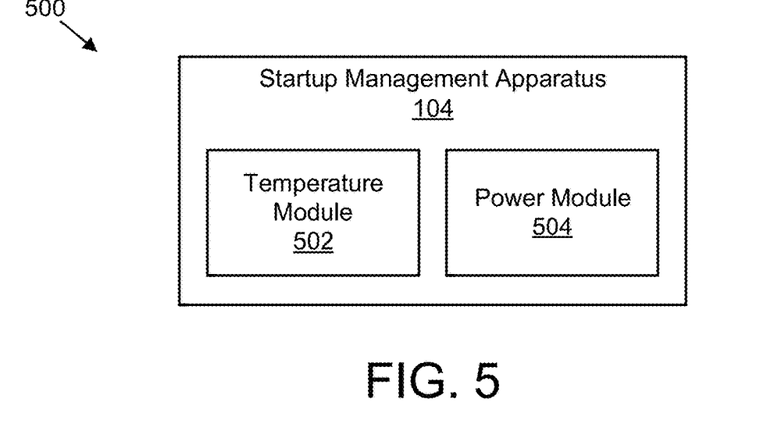
FIG. 5 is a schematic block diagram illustrating one embodiment of an apparatus for power management during system startup at low temperatures.

FIG. 5 is a schematic block diagram illustrating one embodiment of an apparatus 500 for power management during system startup at low temperatures. The apparatus 500, in one embodiment, includes an instance of a startup management apparatus 104. The startup management apparatus 104, in certain embodiments, includes a temperature module 502 and a power module 504, which are described in more detail below.

The temperature module 502, in one embodiment, is configured to monitor a temperature associated with an electronic device or a computing device 100 during startup of the electronic device. The temperature module 502, for example, may use the thermometer 116 to measure the temperature during startup of the computing device 100.

In one embodiment, the power module 504 is configured to make adjustments that are related to the battery 102 based on the temperature associated with the computing device 100 during startup of the computing device 100 in response to the temperature being less than a threshold temperature. The threshold temperature may be predefined based on the battery type, size, discharge rate, etc.; the specifications of the computing device 100; the workload at startup, and/or the like. The power module 504 may reference the predefined threshold for the computing device 100 from a read-only memory storage location for the computing device 100.

For example, based on the temperature of the computing device 100, the power module 504 may adjust a discharge current of the battery 102 to be less than a predefined threshold, e.g., 0.5 C. In further embodiments, the power module 504 may disable one or more fans in the computing device 100 that are typically used to dissipate heat from the computing device 100. The power module 504 may disable one or more fans, for instance, during startup when the temperature is below a threshold temperature of 0° Celsius and may reenable the one or more fans when the temperature reaches the threshold temperature of 0° Celsius.

In one embodiment, the power module 504 triggers discharge of the supercapacitors 114 in response to the measured temperature being below a threshold temperature, e.g., 0° Celsius, and may continue to trigger discharge of the supercapacitors until the measured temperature in the computing device 100 reaches the threshold temperature.

In one embodiment, the power module 504 may dynamically adjust the cut-off voltage threshold for the computing device 100 during startup of the computing device 100 in response to the temperature being less than the threshold temperature. The power module 504, for instance, may dynamically adjust the cut-off voltage to be less than the default or predefined cut-off voltage to give the battery 102 a chance to warm-up and allow the computing device 100 to startup. In certain embodiments, the cut-off voltage threshold is set in firmware for the computing device 100 and may be predefined based on the battery type, size, discharge rate, etc.; the specifications of the computing device 100; the workload at startup, and/or the like. The power module 504 may reference the predefined cut-off threshold for the computing device 100 from a read-only memory storage location for the computing device 100.

Figure 6:
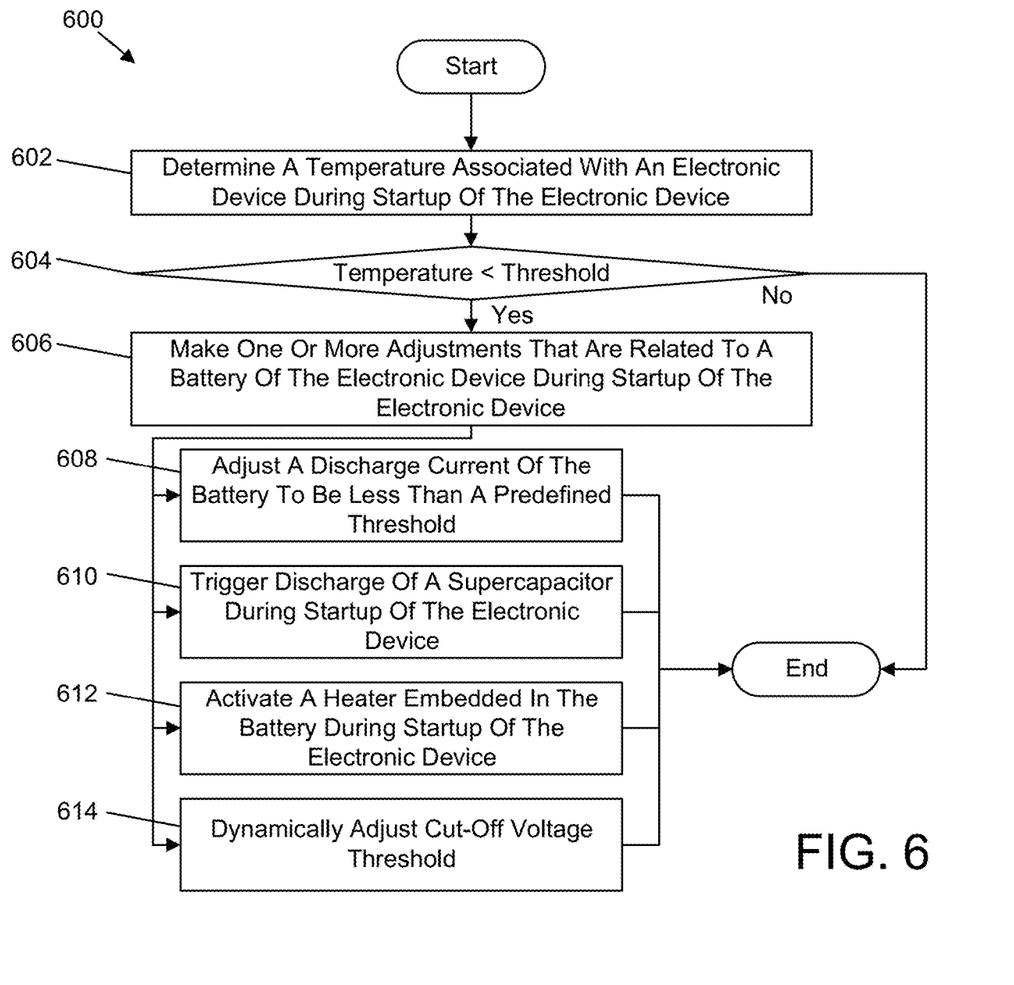
FIG. 6 is a schematic flow chart diagram illustrating one embodiment of a method for power management during system startup at low temperatures.

FIG. 6 is a schematic flow chart diagram illustrating one embodiment of a method 600 for power management during system startup at low temperatures. In one embodiment, the method 600 begins and determines 602 a temperature associated with a computing device 100 during startup of the computing device 100. The computing device 100 includes a battery 102 and a thermal insulation element 110 configured to insulate heat that the battery 102 generates.

In one embodiment, the method 600 determines 604 whether a temperature within the computing device 100 is less than a threshold temperature. If not, the method 600 ends. Otherwise, the method 600 makes 606 one or more adjustments that are related to the battery 102 based on the temperature associated with the computing device 100 during startup of the computing device 100.

For instance, the method 600 may adjust 608 a discharge current of the battery 102 to be less than a predefined discharge threshold. In such an embodiment, the predefined discharge threshold is 0.5 C where C is a rate at which the battery 102 is discharged relative to its maximum capacity.

In another embodiment, the method 600 triggers 610 discharge of a supercapacitor 114 during startup of the computing device 100. In further embodiments, the method 600 activates an electrical heater 112 embedded in the battery 102 during startup of the computing device 100. In some embodiments, the method 600 dynamically adjusts 614 a cut-off voltage threshold for the battery 102. And the method 600 ends. In one embodiment, the temperature module 502 and the power module 504 perform various steps of the method 600.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a battery for an electronic device, the battery comprising one or more cells; and
   a thermal insulation element configured to insulate heat that the battery generates,
   wherein the thermal insulation element is coupled to the battery to prevent at least a portion of the heat that the battery generates from being dissipated from the battery during startup of the electronic device, and
   wherein the thermal insulation element comprises a material configured to insulate heat that the battery generates up to a predefined temperature and to conduct heat away from the battery in response to the heat that the battery generates exceeding the predefined temperature.

2. The apparatus of claim 1, wherein the thermal insulation element is coupled to at least one cell of the one or more cells of the battery.

3. The apparatus of claim 1, wherein the thermal insulation element is coupled to the battery and covers at least one surface of the battery.

4. The apparatus of claim 1, wherein at least one cell of the one or more cells of the battery comprises a jelly roll, the insulation element wrapped around the jelly roll.

5. The apparatus of claim 1, wherein the insulation element comprises an insulating sheet, the insulating sheet comprising a nano silica balloon insulator ("NASBIS") sheet.

6. An apparatus comprising:
   a battery for an electronic device, the battery comprising one or more cells;
   an electrical heating element coupled to the battery, the electrical heating element activated during startup of the electronic device and configured to operate until a threshold temperature is satisfied, wherein the electrical heating element is embedded within a label adhered to the battery; and
   a thermal insulation element configured to insulate heat that the battery generates, wherein the thermal insulation element is coupled to the battery to prevent at least a portion of the heat that the battery generates from being dissipated from the battery during startup of the electronic device.

7. The apparatus of claim 6, wherein the thermal insulation element comprises a material configured to insulate heat that the battery generates up to a predefined temperature and to conduct heat away from the battery in response to the heat that the battery generates exceeding the predefined temperature.

8. A system comprising:
a battery for an electronic device, the battery comprising one or more cells;
a thermal insulation element configured to insulate heat that the battery generates;
a temperature module that monitors a temperature associated with the electronic device during startup of the electronic device; and
a power module that, in response to the temperature being less than a threshold temperature, is configured to limit a discharge current of the battery to be less than a predefined discharge current threshold.

9. The system of claim 8, wherein the predefined threshold is 0.5 C, where C is a rate at which the battery is discharged relative to its maximum capacity.

10. The system of claim 8, wherein the thermal insulation element comprises a material configured to insulate heat that the battery generates up to a predefined temperature and to conduct heat away from the battery in response to the heat that the battery generates exceeding the predefined temperature.

11. The system of claim 8, wherein the power module disables a fan within the electronic device during startup of the electronic device, the fan operable to dissipate heat from the electronic device.

12. A system comprising:
a battery for an electronic device, the battery comprising one or more cells;
a thermal insulation element configured to insulate heat that the battery generates;
a temperature module that monitors a temperature associated with the electronic device during startup of the electronic device; and
a power module that, in response to the temperature being less than a threshold temperature, disables a fan within the electronic device during startup of the electronic device, the fan operable to dissipate heat from the electronic device.

13. The system of claim 12, wherein the thermal insulation element comprises a material configured to insulate heat that the battery generates up to a predefined temperature and to conduct heat away from the battery in response to the heat that the battery generates exceeding the predefined temperature.

14. A system comprising:
a battery for an electronic device, the battery comprising one or more cells;
a supercapacitor;
a thermal insulation element configured to insulate heat that the battery generates;
a temperature module that monitors a temperature associated with the electronic device during startup of the electronic device; and
a power module that, in response to the temperature being less than a threshold temperature, is configured to trigger discharge of the supercapacitor during startup of the electronic device until the temperature reaches a threshold temperature.

15. The system of claim 14, further comprising a heater embedded in the battery, the power module configured to activate the heater during startup of the electronic device.

16. The system of claim 14, wherein the thermal insulation element comprises a material configured to insulate heat that the battery generates up to a predefined temperature and to conduct heat away from the battery in response to the heat that the battery generates exceeding the predefined temperature.

17. The system of claim 14, wherein the power module disables a fan within the electronic device during startup of the electronic device, the fan operable to dissipate heat from the electronic device.

18. A system comprising:
a battery for an electronic device, the battery comprising one or more cells;
a thermal insulation element configured to insulate heat that the battery generates;
a temperature module that monitors a temperature associated with the electronic device during startup of the electronic device; and
a power module that, in response to the temperature being less than a threshold temperature, is configured to dynamically adjust a cut-off voltage threshold for the electronic device during startup of the electronic device, the cut-off voltage threshold set in firmware for the electronic device.

19. The system of claim 18, wherein the thermal insulation element comprises a material configured to insulate heat that the battery generates up to a predefined temperature and to conduct heat away from the battery in response to the heat that the battery generates exceeding the predefined temperature.

20. The system of claim 18, wherein the power module is configured to adjust a discharge current of the battery to be less than a predefined threshold.

* * * * *